March 3, 1942. E. T. JOHNSON ET AL 2,275,259
MOWER
Filed May 2, 1940 4 Sheets-Sheet 1

INVENTOR:
ELLSWORTH T. JOHNSON
NOLAN D. COLVIN
CARL J. FREDERIKSEN
BY
ATTORNEYS.

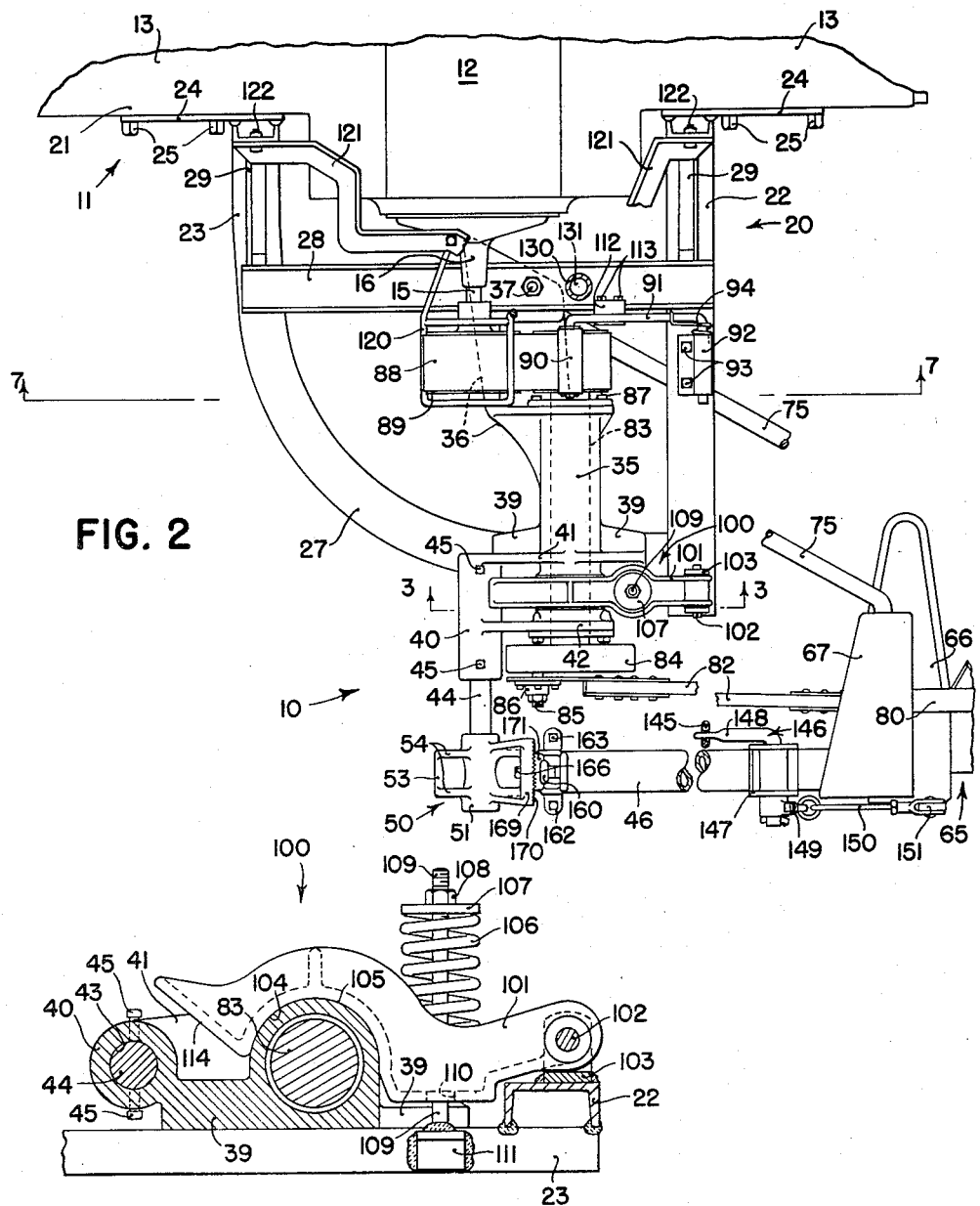

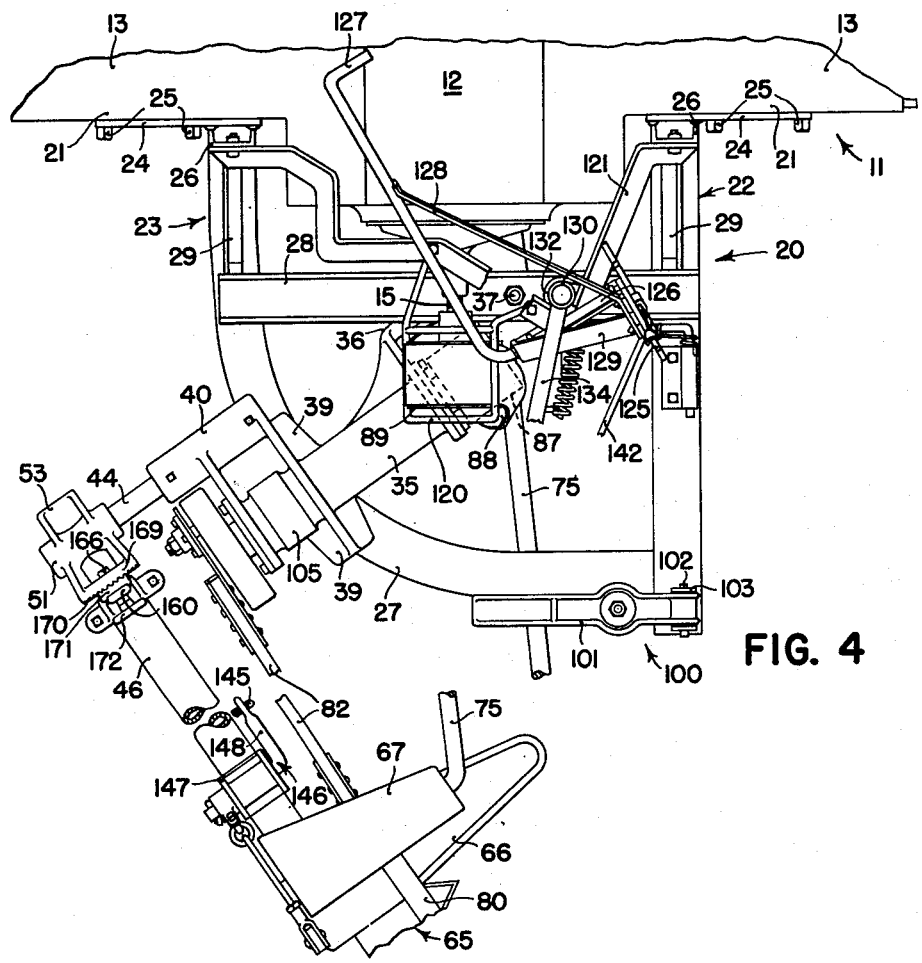
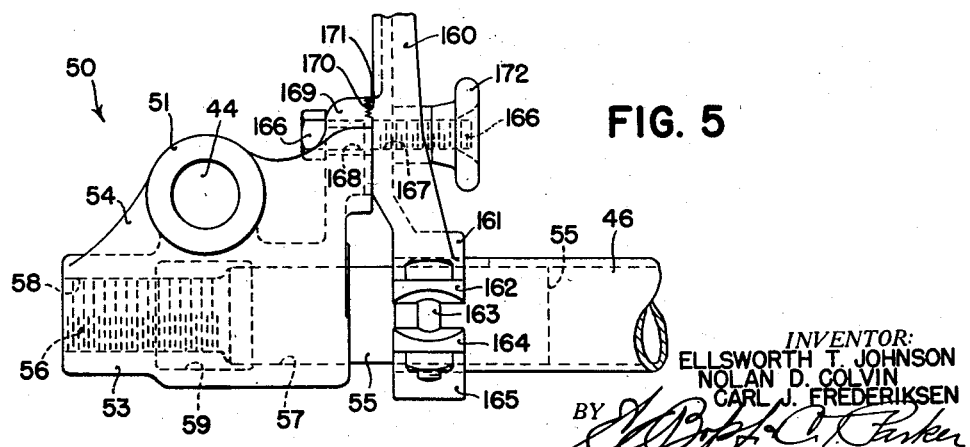

INVENTOR:
ELLSWORTH T. JOHNSON
NOLAN D. COLVIN
CARL J. FREDERIKSEN
BY
ATTORNEYS.

Patented Mar. 3, 1942

2,275,259

UNITED STATES PATENT OFFICE 2,275,259

MOWER

Ellsworth T. Johnson, Nolan D. Colvin, and Carl J. Frederiksen, Moline, Ill., assignors to Deere & Company, Moline, Ill., a corporation of Illinois Application May 2, 1940, Serial No. 332,914

19 Claims. (Cl. 56—25)

The present invention relates to tractor-mounted mowers and has for its primary object the provision of an improved and simplified mower which is durable and inexpensive to manufacture. A more specific object of our invention relates to the provision of a simplified supporting means for mounting a mower on a tractor. A further object has to do with an improved and simplified connection between the supporting arm of the cutter bar and the mower frame. Still another object relates to the provision of a durable and simplified latch mechanism for releasably holding the mower structure relative to its supporting frame. Another object has to do with the provision of a simplified power connection between the tractor power take-off shaft and the mower and providing for the disconnection of the power transmitting means when the mower swings rearwardly upon encountering an obstruction. Another object has to do with the provision of a strong but simple lifting means for raising the mower cutter bar in which the control lever is located conveniently with respect to the tractor operator's position but which does not change its position appreciably when the mower swings rearwardly.

These and other objects will become apparent after a consideration of the following description taken in conjunction with the appended drawings, in which Figure 1 is a side elevation of a mower embodying the principles of our invention and shown mounted on a tractor, one wheel of which is removed to more clearly show the parts of the mower;

Figure 2 is a fragmentary plan view of the mower showing the parts in normal operating position;

Figure 3 is a sectional view taken along a line 3—3 in Figure 2 and drawn to an enlarged scale showing the details of the latch mechanism;

Figure 4 is a fragmentary plan view of the mower shown in trailing position after having been released from the latch mechanism by virtue of encountering an obstruction in the field;

Figure 5 is a rear elevational view drawn to an enlarged scale showing in detail the connecting member by which the cutter bar supporting arm is connected to the mower drive housing;

Figures 1, 6:
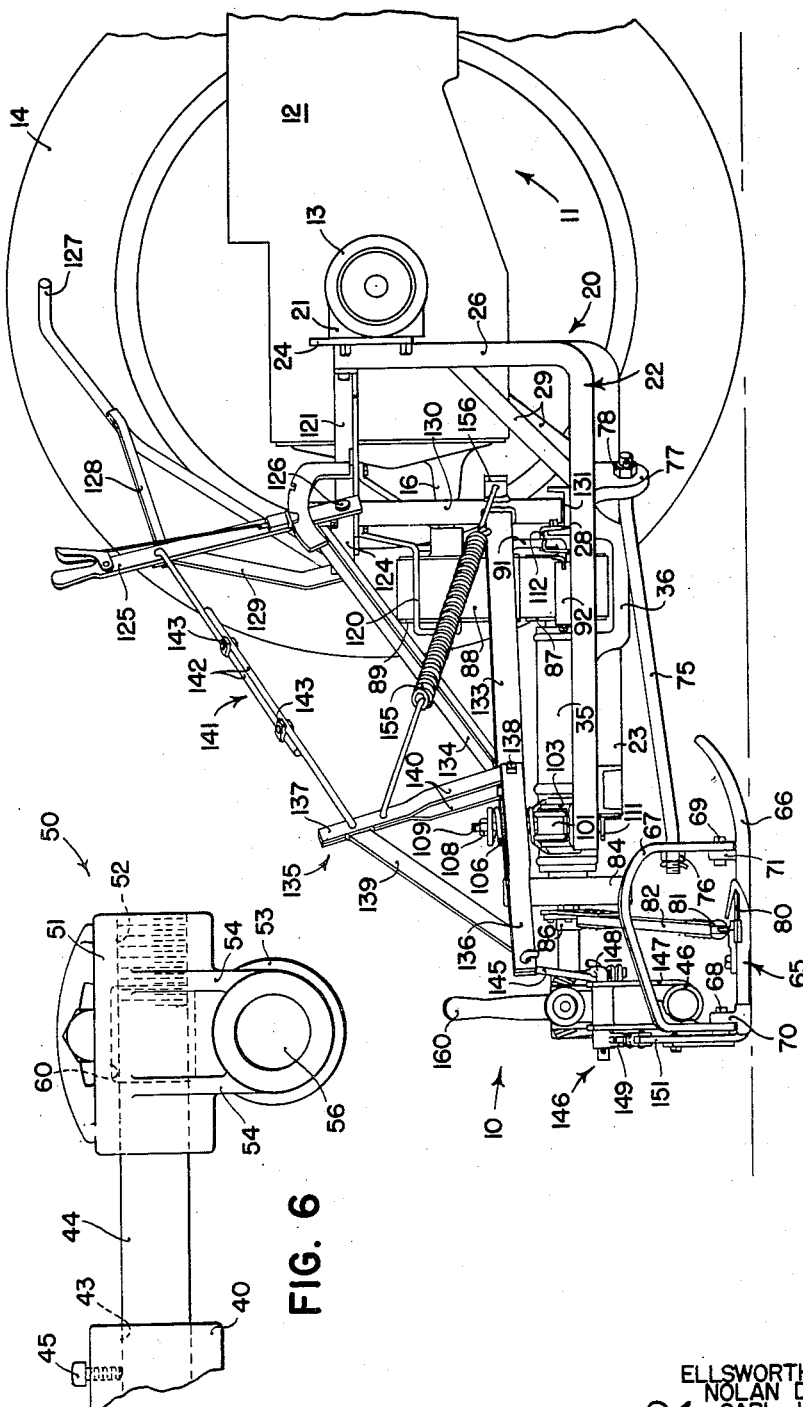
Figure 6 is a side elevational view of the part illustrated in Figure 5.
Figure 7:
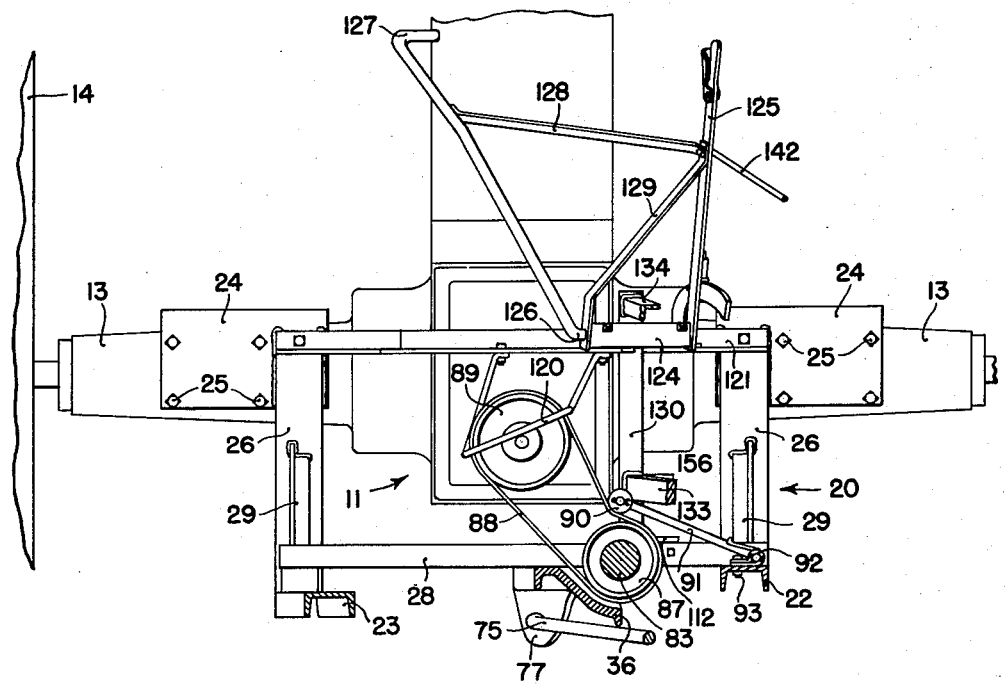
Figure 7 is a sectional rear elevation taken along a line 7—7 in Figure 2.
Figure 8:
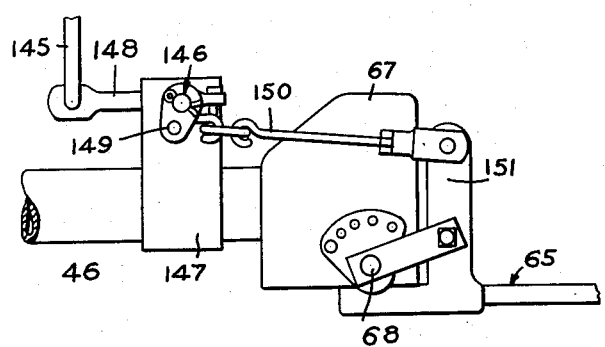
Figure 8 is a fragmentary rear elevation showing the connection between the cutter bar and the supporting arm, and the mechanism for raising the cutter bar.

Referring now to the drawings, the mower, indicated in its entirety by reference numeral 10, is mounted on a tractor 11 of any suitable design comprising generally a central body portion 12 having laterally extending rear axle housings 13 supported on a pair of laterally spaced rear traction wheels 14 and having a rearwardly projecting power take-off shaft 15 carried in a bearing portion 16 on the rear side of the tractor body 12.

The mower is supported on a rigid framework 20 rigidly mounted on the rear axle housings of the tractor which are provided with suitable implement connecting bosses 21, which are well known to those skilled in the art. The frame 20 comprises a pair of main frame members 22, 23, each of which is connected at one end to an attaching plate 24 which is mounted on the axle housing bosses 21 by bolts 25. The main frame members 22, 23 each have a portion 26 extending downwardly from the connecting plate 24 and each of the members 22, 23 turns horizontally rearwardly to form a horizontally disposed supporting frame. One of the frame members 23 is curved horizontally in a circular arc, as indicated at 27, and the two frame members are rigidly interconnected by any suitable means at their points of intersection. The horizontal portions of the two frame members 22, 23 are interconnected near their forward ends by a transversely disposed channel beam 28 and the horizontal and vertical portions of the two beams are braced by diagonal bracing members 29.

The cutter bar supporting structure includes a longitudinally extending frame member in the form of a tubular drive housing 35. The tubular housing is preferably in the form of a casting and having a forwardly extending yoke portion 36 which is pivotally connected to the transverse frame member 28 by means of a pivot bolt 37 providing for lateral swinging movement of the housing 35 relative to the supporting frame 20. The rear end of the housing 35 is supported upon the curved portion 27 of the main beam 23 on a pair of laterally extending wings 39 cast integral with the housing 35, and which slidably bears upon the curved portion 27 of the frame member 23. Inasmuch as the beam 23 is curved about the pivot bolt 37 as a center, the sliding portions 39 follow the curve in the member 23 and are supported thereon as the cutter bar structure swings about the pivot bolt 37.

The rear end of the housing 35 is formed with a laterally offset bracket portion 40 formed integrally with the housing 35 and braced thereto by a pair of longitudinally spaced webs 41, 42. The bracket 40 is provided with a longitudinally extending tubular bore 43, best shown in Figures 3 and 6, within which is disposed a spindle 44 rigidly secured to the bracket 40 by a number of set screws 45. The spindle 44 extends rearwardly out of the bracket 40 and provides a support for a cutter bar supporting arm 46.

The cutter bar supporting arm 46 is connected to the spindle 44 by means of a novel connecting member which provides for vertical swinging movement about the fore and aft axis of the spindle 44 and also for tilting movement fore and aft about the transversely disposed axis of the cutter bar supporting arm 46. The connecting member 50 comprises a longitudinally extending sleeve portion 51 having a bore 52 adapted to receive the rear end of the spindle 44, which is threaded to engage with internal threads in the bore 52. By virtue of this threaded connection the connecting member 50 is rotatable relative to the spindle 44 about the fore and aft extending axis of the latter.

The member 50 further includes a transversely disposed sleeve portion 53 which is cast integrally with the sleeve portion 51 and is strengthened by suitable bracing webs 54.

As best seen in Figure 5, the cutter bar supporting arm 46 is tubular in shape and the inner or supporting end of the latter is provided with a stub shaft 55 which is fixed, as by welding, in the end of the tubular arm 46 and has a threaded end portion 56 of reduced diameter. The transverse sleeve 53 is provided with an internal bore 57 which is adapted to slidably receive the stub shaft 55 adjacent the end of the sleeve 46, while the opposite end of the bore is of reduced diameter, as indicated at 58, and is threaded to receive the threaded end 56 of the shaft 55. The central portion of the sleeve 53 is cored to produce an enlarged space 59 between the bearing portion 57 and the threaded portion 58 of the bore to provide sufficient relief that the shaft 55 will rotate freely within the sleeve 53 and thus provide for rocking the cutter bar supporting arm 46 about its major axis in order to adjust the plane of the cutter bar angularly with respect to the ground.

The bore 52 is also provided with an enlarged central portion 60 which is cored in the sleeve 51 to provide sufficient relief to permit the connecting member 50 to be readily rocked about the major axis of the spindle 44 to permit the cutter bar supporting arm to be raised and lowered relative to the housing 35.

On the outer end of the cutter bar supporting arm is mounted a cutter bar 65 of any suitable conventional construction, the details of which form no part of the present invention. The cutter bar is rigidly supported at its inner end on a shoe 66 which is pivotally mounted on a shoe arch 67 on a pair of fore and aft spaced pivot bolts 68, 69 disposed coaxially at the two ends of the shoe arch 67, respectively, and are received within suitable apertures in a pair of fore and aft spaced supporting lugs 70, 71 on the cutter bar shoe 66. The shoe arch 67 is rigidly fixed to the end of the supporting arm 46 by any suitable means, as by welding.

The cutter bar is maintained in laterally extending position during normal operation by means of a drag link 75 connected at its rear end to the forward leg of the shoe arch 67 by means of a nut 76, as best shown in Figure 1. The drag link 75 extends obliquely forwardly and inwardly and the forward end is received within a suitable aperture in a downwardly extending lug 77 at the forward end of the bracket 36 of the housing 35 and is suitably retained therein by a nut 78.

Slidably disposed on the cutter bar 65 is a more or less conventional sickle 80 which is connected by a ball and socket joint 81 to a pitman 82 which is driven by a power transmitting shaft 83 which is journaled in the longitudinally disposed drive housing 35 and projects forwardly and rearwardly therefrom. On the rear end of the drive shaft 83 is mounted a flywheel 84 to which is fixed a crank pin 85 in eccentric relation thereto. The inner end of the pitman 82 is provided with a bearing 86 journaled on the crank pin 85, whereby rotation of the drive shaft 83 transmits a reciprocating movement through the pitman 82 to the sickle 80. A belt pulley 87 is fixed to the forward end of the drive shaft 83 and this pulley is driven through a flat power transmitting belt 88 from a driving pulley 89 fixed to the power take-off shaft 15 of the tractor 12. The belt 88 is maintained in tight driving relation by means of an idler 90 which is journaled on the end of a U-shaped crank axle 91, the opposite end of which is swingably supported in a bearing 92 fixed to the frame member 22 by bolts 93. The idler 90 is pressed against the upper surface of the belt 88 by means of a spring 94 which is coiled around the supporting leg of the crank axle 91 and acts to force the idler 90 against the belt, when the cutter bar structure is in normal operating position.

The cutter bar structure is normally held against swinging rearwardly and inwardly on its pivotal connection 37 by means of a latch mechanism 100, which will now be described. The latch mechanism 100 comprises a transversely disposed latch member 101 which is pivotally mounted on a pivot bolt 102 supported in a bracket 103 on the rear end of the main frame member 22, as best shown in Figures 2 and 3. The latch member 101 extends laterally inwardly from the pivot 102 and is swingable in a vertical plane about the fore and aft extending axis of the pivot 102. A concave hooked portion 104 is provided on the under side of the latch 101, which embraces the upper side of a cylindrical portion 105 at the rear end of the drive housing 35. A compression spring 106 presses downwardly on the latch member 101 between the housing portion 105 and the pivot 102 to hold the latch member in yielding engagement with the drive housing. The spring 106 reacts against a washer 107 which bears against a nut 108 threaded on the upper end of a rod 109 which extends downwardly through the spring 106 and through an opening 110 in the latch member and is fixed, as by welding, to an L-shaped bracket 111 welded on the rear side of the frame member 23.

When the cutter bar strikes an obstruction in the field during operation, the forward motion of the tractor exerts a force tending to swing the cutter bar and its supporting structure inwardly and rearwardly about the pivot 37 and tending to force the housing 35 out from under the latch member 101 and forcing the latter upwardly against the pressure of the spring 106. The spring pressure can be adjusted by means of the nut 108 so that the normal drag of the cutter bar during operation is not sufficient to release the latch, but when the cutter bar strikes a stone or stump the latch is released and the cutter bar and supporting structure swing about the pivot 37. This causes the bearing portions 39 to slide laterally on the curved section 27 of the beam 23 and thus supporting the rear end of the drive housing as the latter swings away from the latch and thereby allowing the cutter bar to swing rearwardly into trailing position behind the tractor. The driven pulley 87 swings laterally with the drive housing 35 to a position directly underneath the drive pulley 89 and thus moving the belt 88 away from the idler 90 and at the same time decreasing the distance between the pulleys, thereby loosening the belt and interrupting the drive to the sickle. The idler 90 drops only a short distance until the supporting crank axle 91 is received upon a bracket 112 which is fixed to the transverse frame beam 28 by bolts 113.

The cutter bar is then returned to latched position by backing the tractor and causing the drive housing to swing back into engagement with the latch 101, which is provided with an inclined camming surface 114 which rides up over the housing portion 105 and returns the latch member to latched position. As the housing 35 swings back to normal position, the pulley 87 moves the belt 88 against the idler 90 once again, the latter having been held in proper position by the bracket 112, thus restoring the driving relation between the two pulleys. The belt 88 is prevented from throwing off the pulleys by means of a belt retainer 120 comprising a metal rod bent into the form of a loop encircling the upper portion of the driving pulley 89 in a position in which it can engage the edge of the belt 88 when it tends to slip axially off the pulley 89. The retainer 120 is supported on a transversely extending frame member 121, which is spaced above the horizontal supporting frame of the mower and is supported at its opposite ends on bolts 122 which are connected to the upper ends of the vertical portions 26 of the main frame members 22, 23, respectively.

The cutter bar is raised and lowered by means of a hand lever 125 which is fixed to a rock shaft 126 which is journaled in a bracket 124 rigidly fixed to the frame member 121. The opposite end of the rock shaft 126 is bent forwardly and extends to a position in which it conveniently serves as a foot lever, the forward end 127 being bent to provide a pedal operable by the foot of the tractor operator. The foot lever is braced to the hand lever 125 by a pair of braces 128, 129. A vertically disposed sleeve 130 is rotatably mounted on a vertical spindle 131 which is fixed on the transverse frame beam 28, and the upper end of the sleeve 130 is journaled in a bracket 132 fixed to the upper frame member 120. A horizontal boom 133 is rigidly fixed, as by welding, to the rotatable sleeve 130 and extends rearwardly therefrom and the boom is strengthened by a diagonally extending brace 134 connecting the outer end of the boom with the upper end of the sleeve 130. At the outer end of the boom is mounted a bell crank 135 comprising a pair of angularly related levers 136, 137, respectively, connected to the boom at their inner ends by a common pivot bolt 138, their outer ends being interconnected by a rigid brace 139. Each of the levers 136, 137 is bifurcated, as indicated at 140 in Figure 1, to straddle the outer end of the boom 133, the pivot bolt 138 extending through aligned apertures in the two legs of each lever and the boom itself. The hand lever 125 is connected to the bell crank 135 by means of an extensible link 141 comprising a pair of rods 142 adjustably fixed together by clamps 143. By adjusting the length of the link 141 the position of the hand lever 125 and foot lever 127 can be adjusted to the most convenient position. The lower lever 136 of the bell crank 135 is connected by a link 145 to the conventional raising mechanism, indicated in its entirety by reference numeral 146, which is well known to those skilled in the art, but which comprises briefly a bell crank 146 journaled on the cutter bar supporting arm 46 for rocking movement about an axis perpendicular to the axis of the arm 46 in a bracket 147 which is rigidly fixed, as by welding, to the arm 46. The forward arm 148 of the bell crank 146 is connected to the link 145 and the rearward arm 149 is connected by means of a link 150 to a vertical arm 151 which is rigidly fixed to the mower shoe 66 at the rear end of the latter. Thus a forward pull on the hand lever 125 is transmitted through the bell crank 135 and the link 145 to the arm 148 of the bell crank 146, swinging the latter upwardly and causing the downwardly extending arm 149 to exert a pull on the link 150, which swings the vertical lever 151 together with the cutter bar 65 upwardly about the pivots 68, 69 of the cutter bar and at the same time raising the cutter bar supporting arm 46 in a manner well known to those skilled in the art, the mechanism being so designed as to cause the lifting force to raise the cutter bar slightly above a horizontal position and then to swing the cutter bar supporting arm 46 upwardly about its threaded joint connection between the longitudinal sleeve 51 and the spindle 44.

By virtue of the fact that the boom supporting sleeve 130 is journaled about a vertical axis which is closely adjacent to the axis of the pivot bolt 37, it is evident that when the cutter bar swings rearwardly about the pivot bolt 37, the boom 133 swings laterally and the linkage between the hand lever 125 and the cutter bar is not changed in position to any appreciable extent by the swinging of the cutter bar and boom. The hand lever 125 does not swing with the boom but the link connection between the lever and the bell crank swings at its point of connection with the lever 125, which point, it will be noted, is very near the vertical axis of the boom supporting sleeve 130.

The weight of the cutter bar and its supporting arm is counterbalanced by means of a spring 155 connected to the upper lever 137 of the bell crank 135 and anchored at its forward end to a bracket 156 which is welded to the boom supporting sleeve 130, hence the spring swings laterally with the boom and exerts an upward force at all times upon the bell crank 135.

The cutter bar is tilted longitudinally to adjust the angle between the fore and aft extending plane of the cutter bar and the ground by means of a manually actuated lever 160 which is formed integrally with a clamping member 161 which embraces the upper half of the cutter bar supporting arm 46. The clamping member 161 is provided with a pair of outwardly extending ears 162 which are clamped by means of bolts 163 to the corresponding ears 164 of a cooperative clamping member 165 which embraces the lower half of the arm 46. The cutter bar is secured in adjusted position by means of a bolt 166 which extends through an aperture 167 in the lever 160 and through an arcuate slot 168 in a vertically extending locking portion 169 of the connecting member 50. The locking sector 169 is provided with a serrated vertical face 170 which is engaged by a cooperative serrated member 171 fixed to the adjusting lever 160. The lever 160 is clamped against the locking sector 169 by means of a hand-operated nut 172 engaging the threaded end of the bolt 166. When adjusting the tilt of the cutter bar, the nut 172 is loosened sufficiently to permit the teeth 171 of the lever 160 to be moved past the serrated face 170 of the locking sector 169, and when the nut 172 is tightened, the cutter bar is held rigidly against tilting relative to the connecting member 50. The cutter bar can be shifted laterally relative to the sickle by first loosening the clamping bolts 163 and removing the spindle 44 from the sleeve 40 after the set screws 45 have been loosened, after which the connecting member 50 can be given one or more complete turns on the threaded shaft 56 and thus adjusting the register of the cutter bar with respect to the sickle.

The alignment of the pitman 82 with respect to the sickle, can be accomplished by loosening the set screws 45 and sliding the spindle 44 in or out of the sleeve 40, or by screwing the threaded end of the spindle 44 into or out of the tapped opening 52 in the sleeve 51 of the connecting member 50.

We do not intend our invention to be limited to the exact details shown and described herein except as set forth in the following claims.

We claim:

1. A tractor mower comprising a supporting frame adapted to be rigidly mounted on a tractor and disposed generally horizontally, a longitudinally extending frame member pivotally connected at one end thereof to said supporting frame and swingable laterally, the other end of said member slidable bearing on said supporting frame to support said member, a supporting arm connected to said member and extending laterally therefrom, and a cutter bar mounted on said arm.

2. A tractor mower comprising a supporting frame adapted to be rigidly mounted on the rear of a tractor and disposed generally horizontally, a longitudinally disposed frame member pivotally connected at its forward end to said supporting frame and swingable laterally, the rear end of said frame member being slidably supported on said supporting frame, a cutter bar supporting arm connected to said member and extending laterally therefrom, a cutter bar mounted on said arm, and releasable means for securing said frame member relative to said supporting frame.

3. A tractor mower as claimed in claim 2, further characterized in that said releasable securing means comprises a transversely disposed latch member mounted on the rear end of said supporting frame at one side of said frame member and releasably engaged therewith.

4. A tractor mower comprising a supporting frame, a longitudinally disposed tubular frame member pivotally connected to said supporting frame for lateral swinging movement relative thereto, a cutter bar supporting arm mounted on said frame member, and means for yieldably securing said frame member against lateral swinging movement comprising a latch pivotally mounted on said supporting frame and having a concave portion adapted to embrace said tubular member and means for resiliently urging said latch in engagement with said member.

5. A tractor mower comprising a supporting frame adapted to be rigidly mounted on a tractor, a longitudinally disposed tubular housing pivotally connected at its forward end to said frame for lateral swinging movement, the rear end of said housing being slidably supported on said frame, a drive shaft journaled in said housing, a drive connection at the forward end of said shaft for receiving power from a tractor, a cutter bar supporting arm mounted on said frame member, and means for yieldably securing said frame member against lateral swinging movement comprising a latch pivotally mounted on said supporting frame and having a concave portion adapted to embrace said tubular member and means for resiliently urging said latch in engagement with said member.

6. A tractor mower comprising a tubular housing disposed longitudinally relative to the line of travel, a drive shaft journaled in said housing, a drive connection at the forward end of said shaft adapted to receive power from a tractor, said housing having a portion extending forwardly of said drive connection, a supporting frame adapted to be rigidly mounted on a tractor, means disposed ahead of said drive connection for pivotally connecting said housing to said supporting frame for lateral swinging movement relative thereto, the rear end of said housing being slidable on said frame as it swings laterally upon the latter, a cutter bar supporting arm mounted on the rear end of said housing, sickle driving means on the rear end of said drive shaft, and a latch member mounted on said supporting frame and engaging the rear portion of said housing for yieldably holding said housing against lateral swinging movement.

7. A tractor mower comprising a tubular housing disposed longitudinally relative to the line of travel, a drive shaft journaled in said housing, a pulley connected to the forward end of said drive shaft, a power transmitting belt adapted to connect said pulley with a pulley on the power take-off shaft of a tractor, said housing having a portion extending forwardly of said pulley, a supporting frame adapted to be rigidly mounted on a tractor, means disposed ahead of said pulley for pivotally connecting said housing to said supporting frame providing for swinging said housing laterally to move said pulley toward the pulley on the tractor to loosen said power belt, the rear end of said housing being slidably supported on said frame, sickle driving means on the rear end of said drive shaft, a cutter bar supporting arm mounted at the rear end of said housing, and a latch member mounted on said frame at one side of said housing and having a portion yieldably embracing said tubular housing behind said pivot for holding the latter against lateral swinging movement.

8. In a mower, a support, a cutter bar supporting arm, and means for connecting said arm to said support providing for vertical swinging movement of said arm for raising and lowering the latter comprising a pair of cooperative connecting members on said support and said arm, respectively, having interengaging threads disposed coaxial to the axis of vertical swinging movement.

9. In a mower, a drive housing, a horizontally disposed shaft rotatable therein and extending out of one end thereof, a cutter bar, a sickle coactive therewith, a supporting arm to which said sickle is connected, power transmitting mechanism interconnecting said sickle and said shaft, and a threaded connection between said supporting arm and said housing, the axis of said threaded connection being generally parallel to said shaft providing for adjusting said arm to align said power transmitting mechanism and for vertical swinging movement to raise and lower said cutter bar.

10. In a mower, a support, a supporting arm, a cutter bar carried thereby, and means for connecting said arm to said support providing for vertical swinging movement of said arm for raising and lowering the cutter bar and for rotation of said arm about its major axis for tilting the cutter bar, said means comprising a connecting member having a threaded connection with said arm coaxial with the major axis of the latter and a threaded connection with said support having an axis disposed substantially perpendicular to said axis of the arm.

11. In a mower, a support having a horizontally disposed threaded spindle, an arm, a cutter bar pivotally connected at one end of said arm, a connecting member having a threaded socket adapted to receive said threaded spindle in rotatable threaded engagement, said member having a second threaded socket adapted to receive the other end of said arm, the latter being threaded and rotatable therein, and means for adjustably fixing said arm relative to said member.

12. In a mower, a longitudinally extending drive housing, a laterally extending supporting arm, a cutter bar pivotally mounted at the outer end of the latter, a connecting member having a threaded socket disposed on a transverse axis for receiving the inner end of said arm, the latter being threaded for rotatable engagement with said member, adjustable interlocking members on said arm and said connecting member for adjustably setting the position of said arm in said socket for determining the fore and aft angle between the cutter bar and the ground, a threaded connection between said connecting member and said drive housing disposed on a longitudinally extending axis for swingably supporting the inner end of said arm on said drive housing for raising and lowering the cutter bar, and lifting means for swinging said arm about said longitudinally extending axis.

13. A mower comprising a wheel supported frame, a drive housing pivotally connected thereto for swinging movement in a generally horizontal plane, a cutter bar swingably connected to said housing providing for raising and lowering of the cutter bar relative thereto, and means for lifting said cutter bar including a boom, means for pivotally mounting said boom on said frame providing for horizontal swinging movement of the boom when said housing swings horizontally, and lifting mechanism mounted on said boom and connected with said cutter bar.

14. A mower comprising a wheel supported frame, a transverse cutter bar, a supporting structure therefor having a pivotal draft connection with said frame providing for rearward swinging movement of said cutter bar and structure when said bar encounters an obstruction, a boom pivotally mounted on said frame to swing horizontally with said structure, a bell crank mounted on the end of said boom and connected with said cutter bar structure, and means for rocking said bell crank to lift said cutter bar.

15. A mower comprising a wheel supported frame, a transverse cutter bar, a supporting structure therefor having a pivotal draft connection with said frame providing for rearward swinging movement of said cutter bar and structure when said bar encounters an obstruction, a boom pivotally mounted on said frame to swing horizontally with said structure, and a lever mounted on said frame and flexibly connected through means on the end of said boom with said cutter bar to lift the latter.

16. A mower comprising a wheel supported frame, a transverse cutter bar, a supporting structure therefor having a pivotal draft connection with said frame providing for rearward swinging movement of said cutter bar and structure when said bar encounters an obstruction, a boom pivotally mounted on said frame to swing horizontally with said structure, a bell crank mounted on the end of said boom and connected with said cutter bar structure, and a lever mounted on said frame and flexibly connected with said bell crank to lift said cutter bar.

17. A mower comprising a wheel supported frame, a transverse cutter bar, a supporting structure therefor having a pivotal draft connection with said frame providing for rearward swinging movement of said cutter bar and structure when said bar encounters an obstruction, a boom pivotally mounted on said frame to swing horizontally with said structure, a bell crank mounted on the end of said boom and connected with said cutter bar structure, means for rocking said bell crank to lift said cutter bar, and a counterbalancing spring connected between said boom and said bell crank.

18. A mower comprising a wheel supported frame, a transverse cutter bar, a supporting structure therefor having a pivotal draft connection with said frame providing for rearward swinging movement of said cutter bar and structure when said bar encounters an obstruction, a boom pivotally mounted on said frame to swing horizontally with said structure, a bell crank mounted on the end of said boom and connected with said cutter bar structure, a lifting lever pivotally mounted on said frame, and a link connected at one end to said bell crank and pivotally connected to said lever approximately on the axis of swinging movement of said boom, whereby swinging movement of said cutter bar structure and boom has little effect on the position of said lever.

19. A tractor mower comprising a supporting frame adapted to be rigidly mounted on a tractor and disposed generally horizontally, a longitudinally disposed frame member pivotally connected at one end thereof to said supporting frame and swingable laterally, the other end of said member slidably bearing on said supporting frame to support said member, a supporting arm connected to said member and extending laterally therefrom, a cutter bar swingable vertically on said arm, releasable means for securing said frame member against said lateral movement, a boom pivotally mounted on said supporting frame for lateral swinging movement, a manually operated lever mounted on said supporting frame and means supported on the end of said boom interconnecting said lever and said cutter bar for swinging said cutter bar vertically.

ELLSWORTH T. JOHNSON.
NOLAN D. COLVIN.
CARL J. FREDERIKSEN.